United States Patent
Takei

(10) Patent No.: US 7,289,237 B2
(45) Date of Patent: Oct. 30, 2007

(54) PRINT SERVER, PRINTING SYSTEM, PRINTING METHOD, PRINTING PROGRAM AND COMPUTER-READABLE RECORDING MEDIUM CONTAINING THE PRINTING PROGRAM

(75) Inventor: Hajime Takei, Yokohama (JP)

(73) Assignee: Minolta Co., Ltd., Osaka-Shi, Osaka (JP)

( * ) Notice: Subject to any disclaimer, the term of this patent is extended or adjusted under 35 U.S.C. 154(b) by 1027 days.

(21) Appl. No.: 10/310,953

(22) Filed: Dec. 6, 2002

(65) Prior Publication Data

US 2003/0107764 A1 Jun. 12, 2003

(30) Foreign Application Priority Data

Dec. 7, 2001 (JP) .............................. 2001-374155

(51) Int. Cl.
B41J 1/00 (2006.01)
(52) U.S. Cl. .................... 358/1.15; 358/1.14; 358/1.13; 710/8
(58) Field of Classification Search .................... 710/8, 710/16, 17, 20; 358/1.13, 1.14, 1.15, 2.1, 358/3.24; 399/1, 8
See application file for complete search history.

(56) References Cited

U.S. PATENT DOCUMENTS

| | | | | |
|---|---|---|---|---|
| 4,845,483 A | * | 7/1989 | Negishi | 340/557 |
| 4,860,119 A | * | 8/1989 | Maniwa et al. | 358/296 |
| 5,689,755 A | * | 11/1997 | Ataka | 399/8 |
| 5,812,747 A | * | 9/1998 | Kayano et al. | 358/1.15 |
| 6,078,759 A | * | 6/2000 | Satake et al. | 358/1.15 |
| 6,256,107 B1 | * | 7/2001 | Toda | 358/1.15 |
| 6,636,327 B2 | * | 10/2003 | Yoshida et al. | 358/1.15 |
| 6,985,245 B1 | * | 1/2006 | Takahashi | 358/1.15 |
| 2002/0089692 A1 | * | 7/2002 | Ferlitsch | 358/1.15 |
| 2002/0101604 A1 | | 8/2002 | Mima et al. | |
| 2003/0107764 A1 | * | 6/2003 | Takei | 358/1.15 |
| 2003/0202206 A1 | * | 10/2003 | Shinchi | 358/1.15 |
| 2004/0158654 A1 | * | 8/2004 | Shima | 710/8 |
| 2004/0179218 A1 | * | 9/2004 | Wissenbach | 358/1.15 |
| 2005/0065857 A1 | * | 3/2005 | Sakai et al. | 705/26 |

FOREIGN PATENT DOCUMENTS

| | | |
|---|---|---|
| JP | 11-237964 | 8/1999 |
| JP | 2000-318268 | 11/2000 |
| JP | 2000318268 | * 11/2000 |
| JP | 200114175 | * 10/2001 |

* cited by examiner

Primary Examiner—Kimberly A. Williams
(74) Attorney, Agent, or Firm—Buchanan Ingersoll & Rooney PC

(57) ABSTRACT

In cluster printing, the pages of a print job are divided and output to a plurality of image forming apparatuses. When this is done, a table that records the image size (data size) for each page included in the print job and the speed of data transmission to an image forming apparatus for that page is created. A determination is made whether there are pages with a data transmission speed lower than a threshold value (i.e., whether unprintable pages exist), and if there are, the job is re-divided such that the number of image forming apparatuses to be used is reduced. Consequently, the data transmission speed for each page is prevented from becoming slower than the printing speed.

17 Claims, 6 Drawing Sheets

| PAGE | DATA SIZE | DATA TRANSMISSION SPEED (PPM) |
|---|---|---|
| 1 | 2,459,323 | 536 |
| 2 | 33,568,645 | 119 |
| 3 | 8,754,367 | 457 |
| 4 | 17,239,343 | 232 |
| ... | ... | ... |
| 200 | 22,485,903 | 178 |
| ... | ... | ... |
| 1000 | 14,675,456 | 273 |

PRINT SERVER, PRINTING SYSTEM, PRINTING METHOD, PRINTING PROGRAM AND COMPUTER-READABLE RECORDING MEDIUM CONTAINING THE PRINTING PROGRAM

This disclosure is based upon Japanese Patent Application No. 2001-374155, filed Dec. 7, 2001, the contents of which are incorporated herein by reference.

BACKGROUND OF THE INVENTION

1. Field of the Invention

The present invention relates to a print server, printing system, printing method, printing program and computer-readable recording medium on which the printing program is recorded, and more particularly, to a print server, printing system, printing method, printing program and recording medium containing the printing program that perform printing using a plurality of image forming apparatuses in order to increase printing efficiency.

2. Description of the Prior Art

Office work service shops exist that receive print data for a print job from a customer via a recording medium such as a flexible disk or over a network, output such data onto paper using a printer or other type of image forming apparatus, and provide the printed end product to the customer. Where a large number of sheets of paper is to be output at such a shop, the time required for the job may be reduced by performing the printing in a parallel fashion using a plurality of printers. Printing in this manner using a plurality of printers is referred to as cluster printing. In cluster printing, a print server that manages the multiple printers is used. For example, consider a situation in which four printers are connected to a print server, comprising a cluster printing system. When this cluster printing system receives a job that requires printing of 1,000 pages, the job is divided into sections of pages 1-250, pages 251-500, pages 501-750 and pages 751-1000, such that the four printers each perform printing of 250 pages in a parallel fashion. Consequently, the time required for the completion of printing becomes one quarter of the time that would be needed if the entire printing job were performed using a single printer.

However, in the cluster printing system described above, since the printing speed increases in proportion to the number of printers connected, the speed of data transmission from the print server also must increase in accordance with the number of printers. In general, since a printer such as a laser printer cannot stop the printing routine once it is begun and the photoreceptor drum begins to rotate, if the speed of data transmission to the printer is slower than the printing speed, the transmission of image data for one page cannot be completed during the printing of that page, resulting in missing image parts ("data transmission speed" and "printing speed" in this specification refer to the number of pages of image data that can be processed per minute, and PPM (page per minute) is used as the unit of measurement).

In addition, the hard disk, which comprises the image storage device of the print server, has a limited access speed. The effective page throughput of the print server decreases as the image data size increases, and increases as the image data size decreases. For example, in the case of A4-size, full-color image data, the data size is approximately 32 MB after general image compression, and the 32 MB of data must be sent from the print server to the printer within a prescribed period of time in accordance with the printing speed. On the other hand, where the data is monochrome binary data, the compression rate can be increased, and therefore the data size is approximately 200 KB. The data amount that must be sent in the same period of time accordingly becomes 1/160th of that of the full-color image data.

Furthermore, in the cluster printing system described above, where four printers having the same printing speed are connected and A4-size, full-color image data undergoes processing for printing by the four printers simultaneously, for example, since the overall system printing speed increases by a factor of four, simply calculated, the print server must read 128 MB of data (32×4) from the hard disk in a prescribed period of time and send it to the printers.

Therefore, the likelihood of missing image parts increases as the data size and the number of printers connected to the print server increase.

The present invention was made in order to resolve the problems identified above. An object of the present invention is to provide a print server, printing system, printing method, printing program and recording medium containing the printing program in which no missing image parts occur when an image is formed using a plurality of image forming apparatuses.

SUMMARY OF THE INVENTION

In order to attain the above object, according to one aspect of the present invention, the print server capable of sending data to a plurality of image forming apparatuses includes calculating means that calculates, based on the data size of a page to be printed and the data transmission capacity of the print server, the data transmission speed for the page. A determining means compares the data transmission speed and the printing speed regarding a prescribed number of image forming apparatuses, and determines whether or not there will be missing parts in the printed image when the data is sent to the prescribed number of image forming apparatuses. A control means reduces the number of image forming apparatuses to which the data will be sent when it is determined by the determining means that there would be missing image parts.

According to another aspect of the present invention, the printing system comprises the print server described above and a plurality of image forming apparatuses connected to the print server.

According to yet another aspect of the present invention, the printing method capable of sending data to a plurality of image forming apparatuses includes a step of calculating, based on the data size of a page to be printed and the data sending capacity of the print server, the data transmission speed for the page. A determination step compares the data transmission speed and the printing speed regarding a prescribed number of image forming apparatuses, and determines whether or not there will be missing parts in the printed image when the data is sent to the prescribed number of image forming apparatuses. A control step reduces the number of image forming apparatuses to which the data will be sent when it is determined in the determination step that there would be missing image parts.

According to still another aspect of the present invention, the printing program capable of sending data to a plurality of image forming apparatuses causes the computer to execute a step of calculating, based on the data size of a page to be printed and the data sending capacity of the print server, the data transmission speed for the page. A determination step compares the data transmission speed and the printing speed regarding a prescribed number of image forming apparatuses, and determines whether or not there will be missing parts in the printed image when the data is sent to the prescribed number of image forming apparatuses. A control step reduces the number of image forming apparatuses to which the data will be sent when it is determined that there would be missing image parts in the determination step.

According to still another aspect of the present invention, a printing program that causes the computer to execute the printing method described above is recorded on a computer-readable recording medium.

DETAILED DESCRIPTION OF THE PREFERRED EMBODIMENTS

A printing system pertaining to an embodiment of the present invention is described below with reference to the drawings.

First Embodiment

Figure 1:
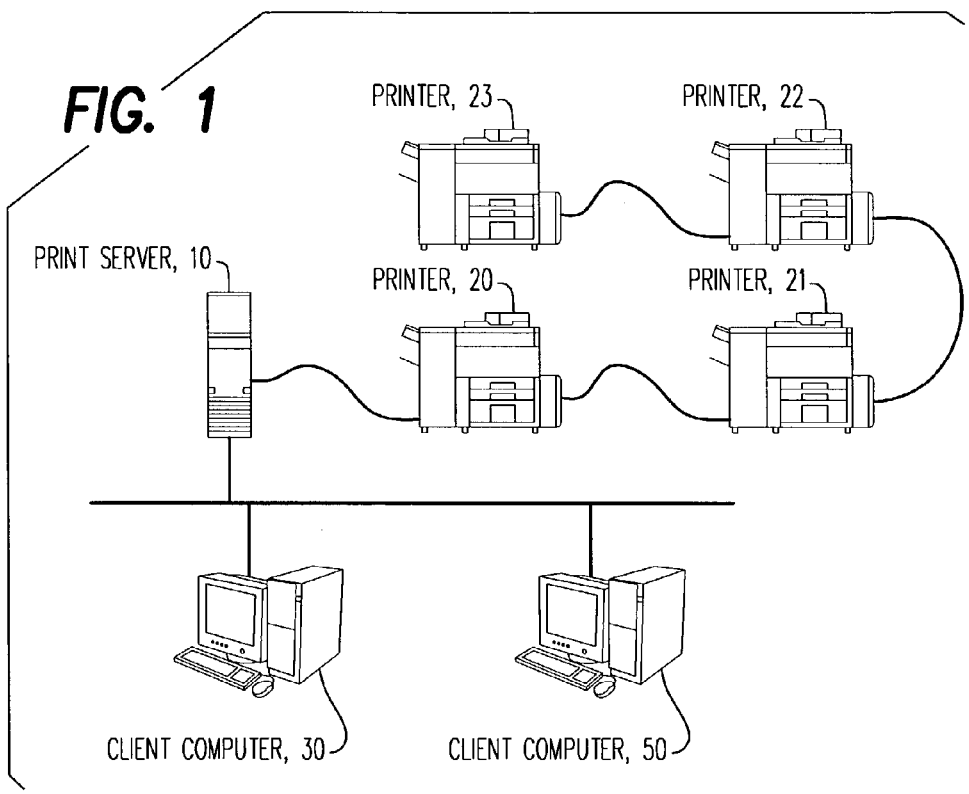
FIG. 1 is a drawing showing the overall construction of a printing system of a first embodiment of the present invention.

FIG. 1 is a drawing showing the overall construction of the printing system pertaining to a first embodiment of the present invention.

The printing system comprises a print server 10 connected to a local area network (hereinafter "LAN"), clients 30 and 50 and a plurality of printers 20-23 connected to the print server 10.

A print job created by the client 30 or 50 (such a job is created by the printer driver based on document data created using various types of application software, spreadsheet data from the routine work system or image data created using image processing software) is sent to the print server 10. The print server 10 converts the print job received from the client 30 or 50 into image data (bitmap data) for image formation by the printers 20-23.

In this embodiment, the print server 10 and the printers 20-23 are connected via IEEE 1394 interfaces, and data transmission is performed using isochronous mode. Priority is placed on data transmission in isochronous mode over other data transmissions. By using isochronous mode, a transmission band is guaranteed and a certain transmission speed is ensured, so that data can be transmitted in accordance with the printers' printing speed. Consequently, the memory capacity used for data buffering in each printer 20-23 can be minimized.

While four printers are connected to the print server in this embodiment, the number of printers that can be connected is not limited to four, and any number of printers may be connected. In addition, other types of image forming apparatuses such as facsimile machines, copying machines or multi-function peripherals may be used in place of printers.

Figure 2:
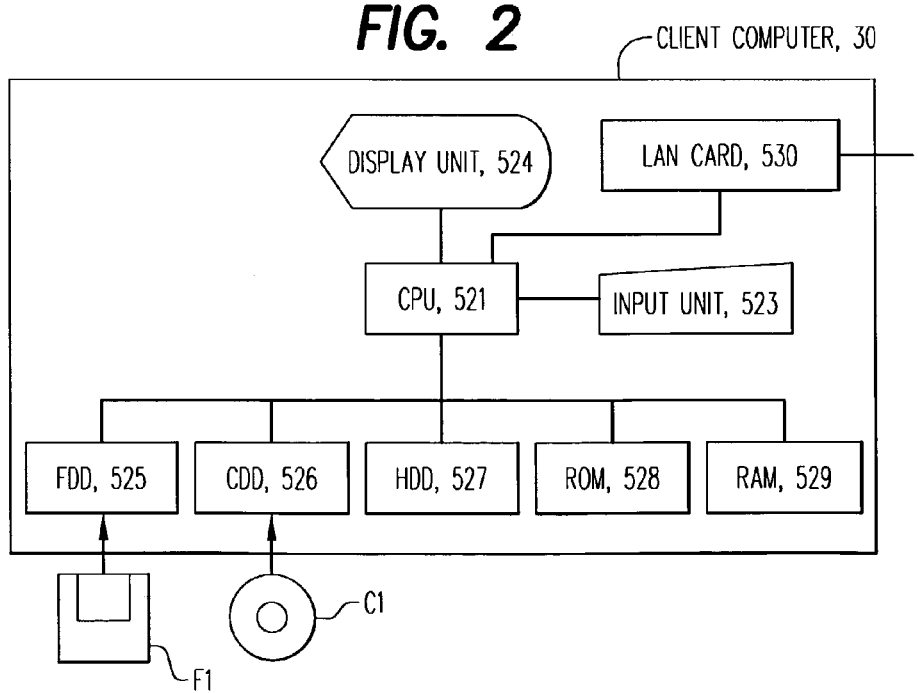
FIG. 2 is a block diagram showing the construction of a client 30 in a schematic fashion.

FIG. 2 is a block diagram showing the construction of the client 30 in a schematic fashion.

The client 30 is a general personal computer. The client 50 is identical to the client 30. (The client 50 therefore will not be described in detail).

The client 30 includes a CPU (central processing unit) 521 that performs overall control of the client 30, an input unit 523 comprising a keyboard and mouse or the like, a display unit 524 comprising a liquid crystal display or the like, a flexible disk drive (FDD) 525 that reads a flexible disk (F1), a compact disk drive (CDD) 526 that reads a CD-ROM (C1), a hard disk drive (HDD) 527 that stores programs (such as the printer driver that controls the printer and the application program for data transmission/receipt) executed by the CPU 521, a ROM (read-only memory) 528 that stores various programs and parameters, a RAM (random access memory) 529 that temporarily stores programs and data as a workarea, and a LAN card 530 comprising an interface for connection to the LAN. The printer driver installed in the hard disk drive 527 is a software program to control the printer. It creates a print job by converting character or image data received from an application into a PDL (page description language) that can be interpreted by the printer. The printer driver also has a layout function by which to reduce images for multiple pages and print them on one sheet of paper as well as a function to monitor the printer status and issue warnings when the printer is out of paper or toner.

Figure 3:
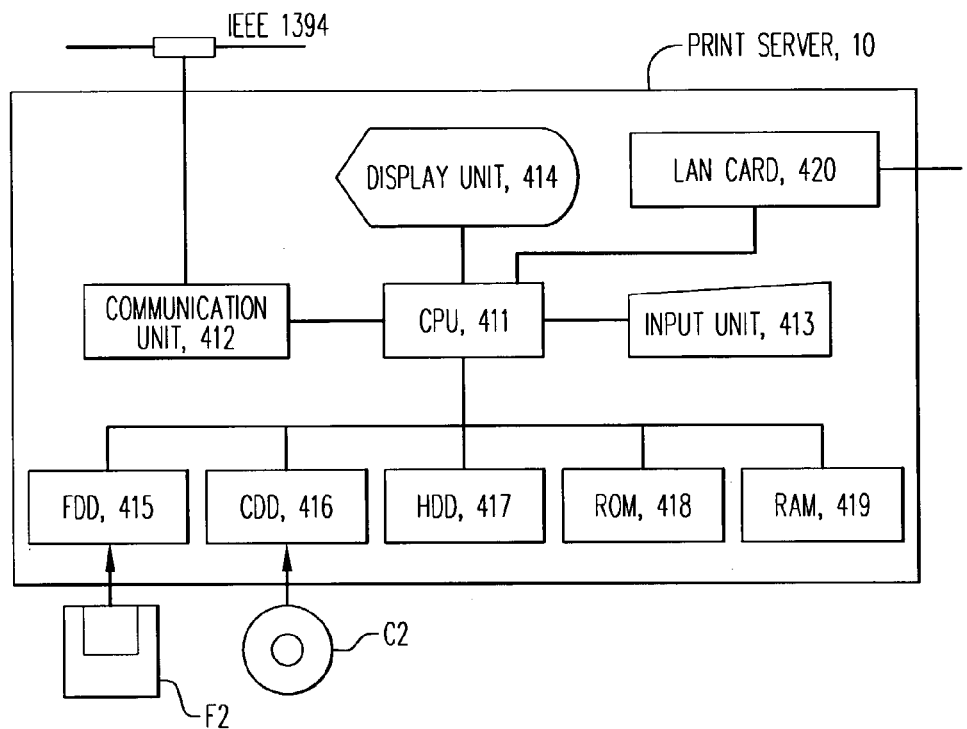
FIG. 3 is a block diagram showing the construction of a print server 10 in a schematic fashion.

FIG. 3 is a block diagram showing the construction of the print server 10 in a schematic fashion.

The print server 10 is a server computer for the printers.

The print server 10 comprises a CPU 411 that performs overall control of the print server 10, as well as an IEEE 1394 serial bus interface and a controller therefor, and includes a communication unit 412 that sends image data and the like to the printer 20 via the IEEE 1394 serial bus, an input unit 413 comprising a keyboard and mouse or the like, a display unit 414 comprising a liquid crystal display or the like, a flexible disk drive (FDD) 415 that reads a flexible disk (F2), a compact disk drive (CDD) 416 that reads a CD-ROM (C2), a hard disk drive (HDD) 417 that stores programs (such as the data transmission/receipt application) executed by the CPU 411, a ROM 418 that stores various programs and parameters, a RAM 419 that serves as a workarea for the programs executed by the CPU 411, and a LAN card 420 that serves as an interface for the LAN connection.

Stored in the HDD 417 are a program that interprets print control data such as the PDL in a print job received from the external client 30 or 50 and converts it into an intermediate record, which comprises data having a format that can be internally processed, and a program that generates image data based on the intermediate record, and by executing these programs, image data can be generated from a print job.

The clients 30 and 50 and the print server 10 may include constituent elements other than those described above, and may not include some of the constituent elements described above.

Figure 4:
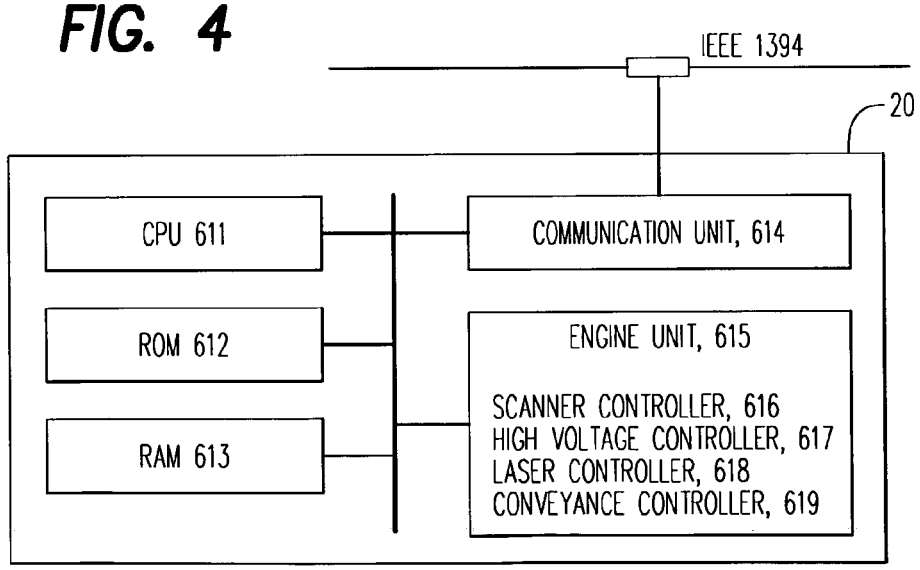
FIG. 4 is a block diagram showing the construction of a printer 20 in a schematic fashion.

FIG. 4 is a block diagram showing the construction of the printer 20 in a schematic fashion.

The printer 20 prints on sheets of paper the image data generated by the print server 10 based on instructions from the print server 10 using the laser printing method. The printers 21-23 have the same construction as the printer 20. (The printers 21-23 therefore will not be described in detail.)

The printer 20 comprises a CPU 611 that performs overall control of the printer 20, a ROM 612 that stores various programs and parameters, a RAM 613 that temporarily stores programs and data as a workarea, an engine unit 615 that performs printing using the laser printing method, and an IEEE 1394 serial bus interface and controller therefor. The printer 20 also has a communication unit 614 that receives image data and the like from the print server 10 via the IEEE. 1394 serial bus. The engine unit 615 has a scanner controller 616 that performs control of the rotation of the polygon mirror, a high voltage controller 617 that performs high voltage control regarding the impression of charging and development biases to the photoreceptor drum and the impression of a transfer bias to the transfer roller, a laser controller 618 that performs control regarding laser beam modulation, and a conveyance controller 619 that performs control regarding the conveyance of the recording media, such as sheets of paper.

In the printing system having the construction described above, the print server 10 and the printers 20-23 are connected via the IEEE 1394 serial bus, and the isochronous transmission mode that guarantees a certain band is adopted.

Figure 5:
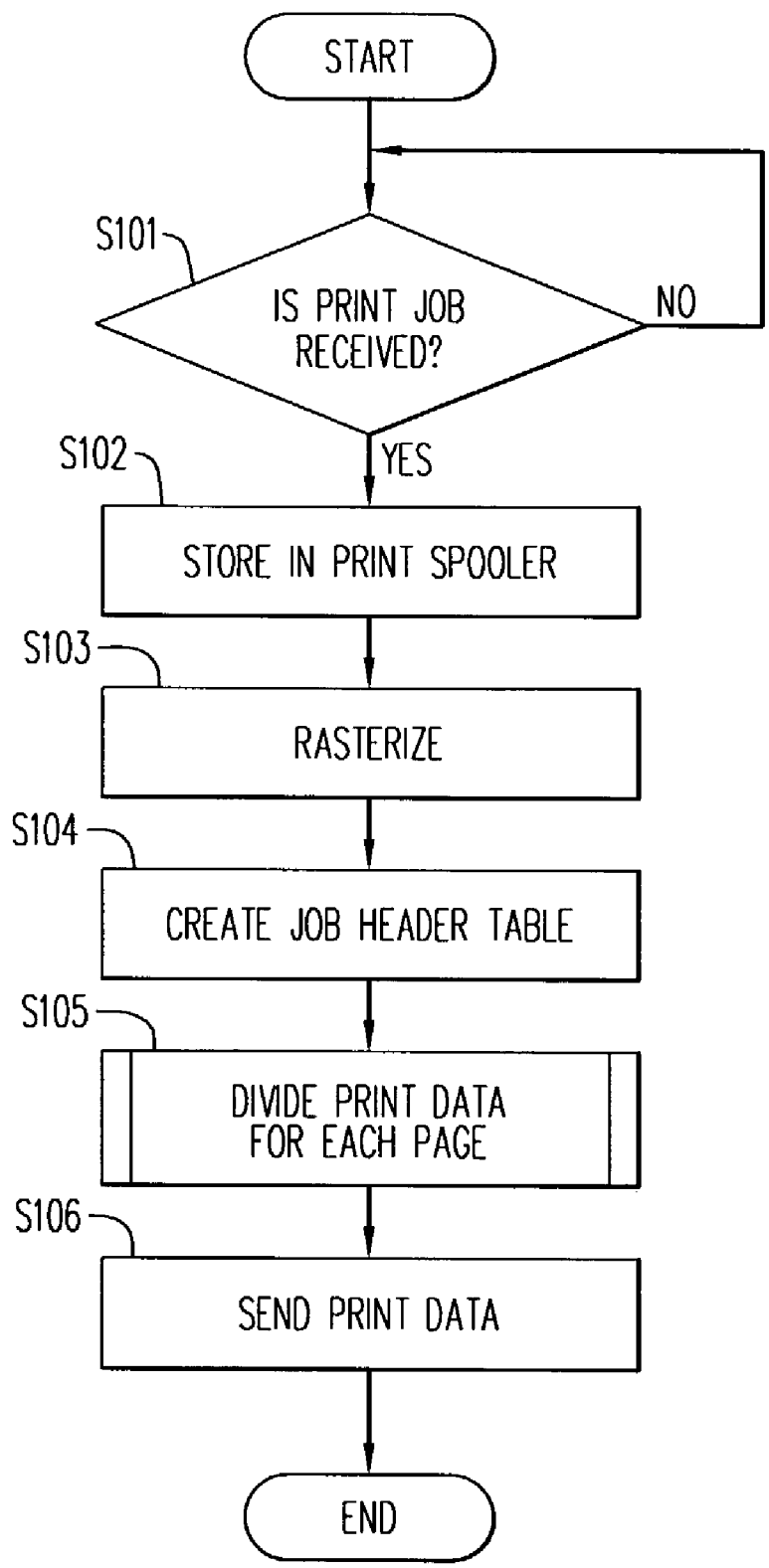
FIG. 5 is a flow chart to explain the routine performed by the print server 10.

FIG. 5 is a flow chart to explain the routine performed by the print server 10. The algorithm executed according to the flow charts shown in FIGS. 5 and 6 is stored in a storage device such as the HDD 417 and is executed by the CPU 411.

First, it is determined whether or not a print job created by the clients 30 or 50 has been received (S101). Where no print jobs have been received (NO in S101), the CPU 411 stands by until one is received. Where a print job has been received (YES in S101), the print job is stored in the HDD 417 (S102). S102 is executed by a print job request management module referred to as a print spooler. The print job, which can now be printed, is rasterized. Specifically, the print job is converted into bitmap image data that can be printed by the printers 20-23 (S103).

Figures 6, 7:
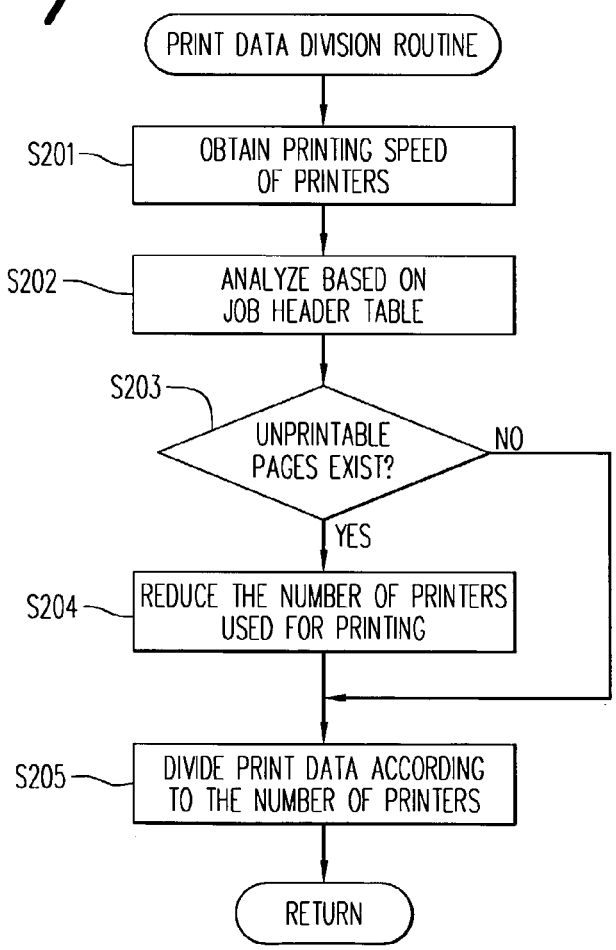
FIG. 6 is a drawing showing a specific example of a job header table.
FIG. 7 is a flow chart showing a print data division routine.

The speed required to forward the image data for each page to the printers (i.e., the speed at which the image data is to be read from the hard disk) is calculated based on the data size per page of the image data obtained as a result of the rasterization, and a job header table is created, as shown in FIG. 6 (S104). In the example of FIG. 6, information related to a print job consisting of images for 1,000 pages and the data size for each page are recorded.

The image data is saved on the hard disk 417 in the print server 10 as compressed data, but the compression rate varies depending on the type of image. For example, the compression rate cannot be high for images using many halftones and color images including photographs, while conversely, the compression rate for monochrome binary images can be high. Consequently, even if each page comprises A4-size image data, the actual data size substantially varies from page to page.

Returning to the flow chart, the number of printers into which the image data should be divided for execution of the print job is determined in S105 based on the content of the job header table. The specific routine of S105 is described below. The image data for the print job obtained as a result of the division is sent to each printer via the IEEE 1394 interface (S106). Specifically, based on the IEEE 1394 standard, a channel is assigned to each printer to which the data is to be sent, and the print server 10 sends in prescribed cycles the image data in the form of packet data for which a printer channel is designated. Each printer receives only package data for which the assigned channel is designated and obtains the image data.

The print data division routine in S105 will now be explained with reference to the flow chart of FIG. 7.

The overall printing speed of the printers that are connected to the print server 10 and are available for printing is obtained (S201). Specifically, the status information regarding each printer is obtained, it is determined based on the status information whether or not each printer is available for printing, and the printing capacity information is obtained from the status information for each printer available for printing. For example, where four printers are designated as being available for printing and each printer can perform printing at 40 pages per minute (40 PPM), the printing speed of this system is 160 PPM (4×40 PPM). The printing speed and the data transmission speed for each page are then compared based on the job header table (S202).

For example, because the data size for the second page in the job header table of FIG. 6 is large and can be sent only at the speed of 119 PPM, which is slower than the 160 PPM printing speed, missing image parts would result. Where unprintable pages exist as a result of the comparison between the printing speed and the data transmission speed for each page (YES in S203), the printing speed is reduced by reducing the number of printers to be used to a value less than the total number of available printers, in order to prevent the occurrence of missing image parts (S204). Specifically, where the data transmission speed for the largest data size page is 119 PPM, the number of printers is set to be two such that the printing speed becomes 119 PPM or lower. Where there are no unprintable pages (NO in S203), the number of printers that are available for printing is set as the prescribed number of printers to perform printing. A channel is assigned to each of the set printers based on the IEEE 1394 standard, and data packets for each designated channel are sent from the print server 10 via the IEEE 1394 interface. The multi-page image data is then divided in accordance with the set number of printers (S205). Where the image data is for 1,000 pages and is to be printed by two printers in a parallel fashion, for example, the image data is divided into two data sets of 500 pages each. The image data sets resulting from the division are sent to the corresponding printer to which a channel was assigned based on the IEEE 1394 standard as a data packet for which a channel is designated. By reducing beforehand in this way the number of printers to perform printing in a parallel fashion, the printing speed is prevented from exceeding the data transmission speed, thereby eliminating missing image parts.

Second Embodiment

The construction of the printing system pertaining to a second embodiment is identical to that of the first embodiment, and therefore will not be described here.

Figure 8:
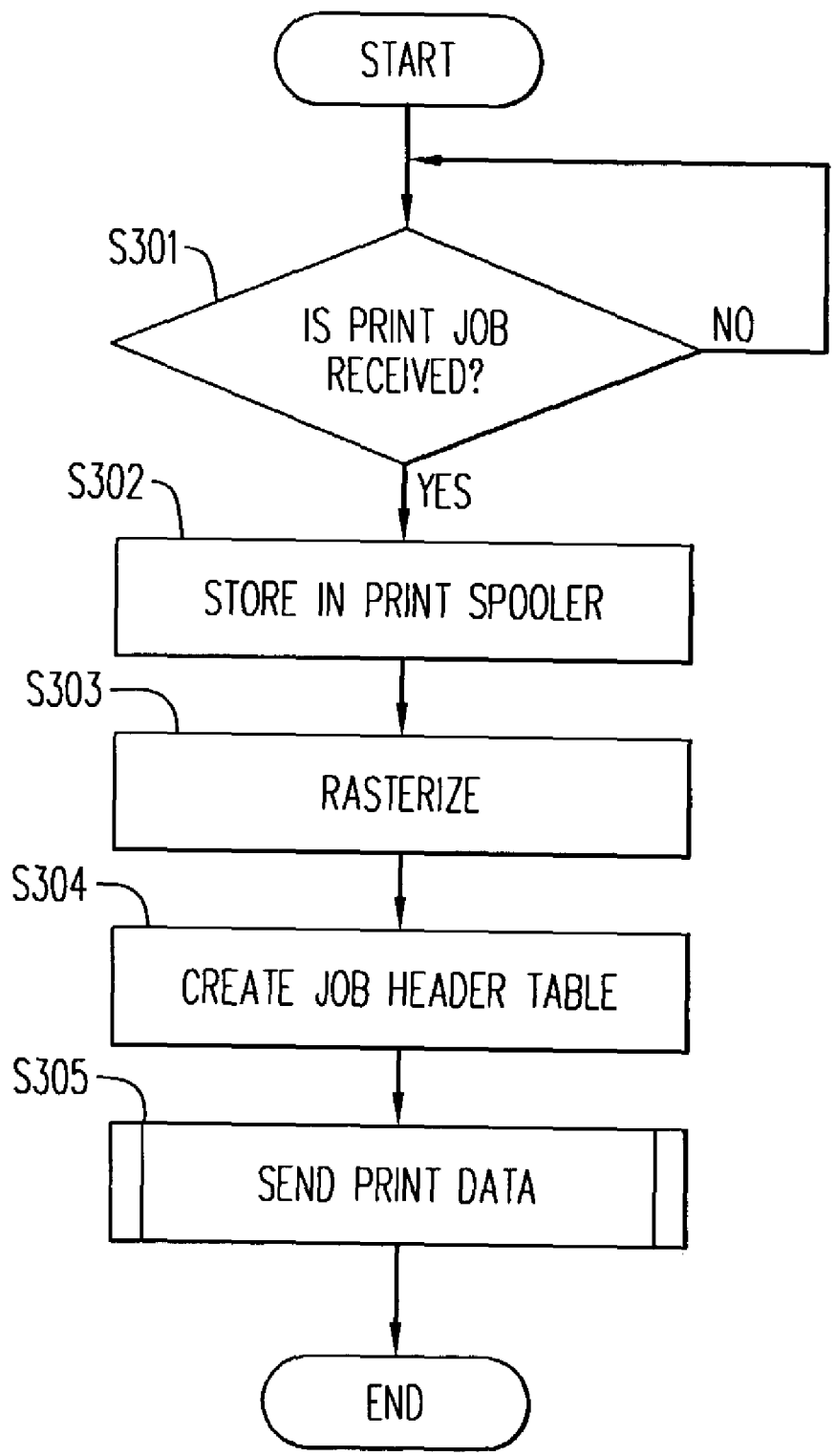
FIG. 8 is a flow chart to explain the routine performed by the print server 10 of a second embodiment.
Figure 9:
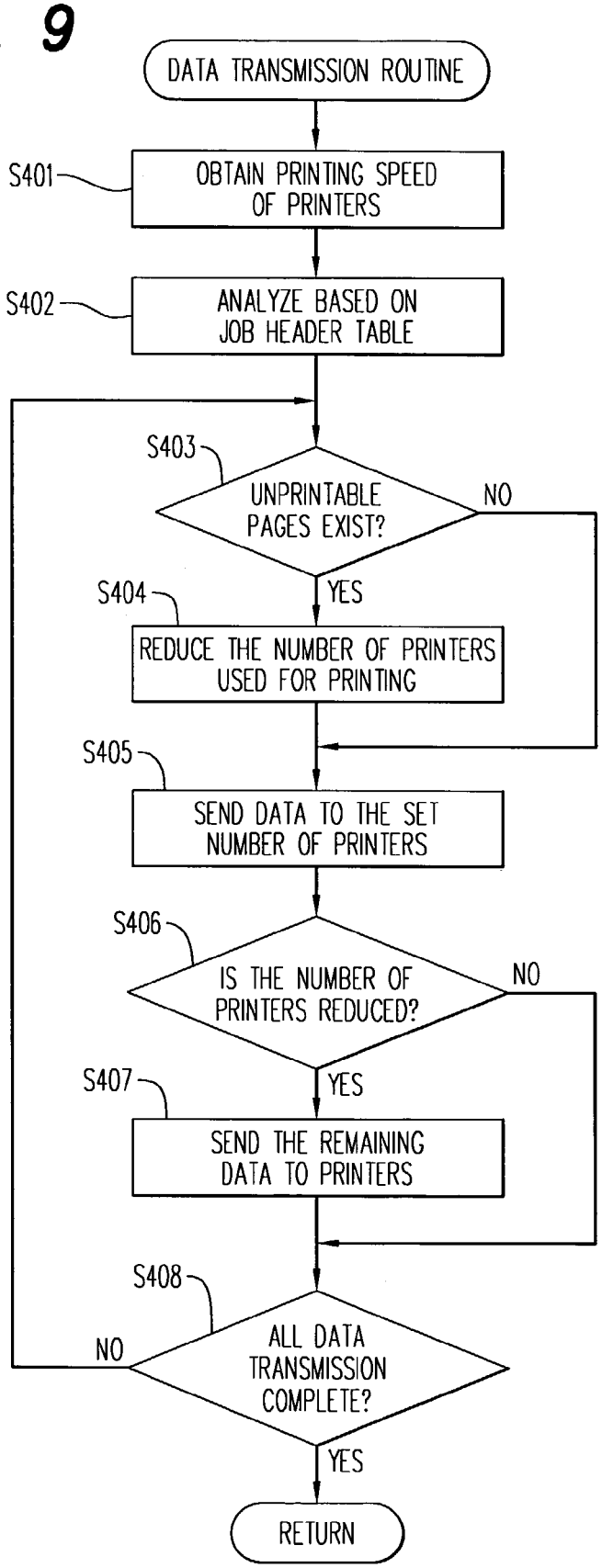
FIG. 9 is a flow chart to explain a data transmission routine.

FIG. 8 is a flow chart to explain the routine executed by the print server 10 pertaining to the second embodiment. The algorithm executed in accordance with the flow charts shown in FIGS. 8 and 9 is stored in a storage device such as the HDD 417, and is executed by the CPU 411.

The steps S301-S304 in FIG. 8 are identical to the steps S101-S104 in FIG. 5.

In S305, the image data pertaining to the print job is sent to each printer via the IEEE 1394 interface. In the first embodiment, the image data is divided prior to any transmission thereof based on the job header table, in order to prevent missing image parts, and the number of printers used for the print job is constant throughout the job. As a variation, step S305 of the second embodiment reduces the number of printers to which the image data is sent only when data for pages that would cause missing image parts is to be sent, while the image data transmission continues. In this, embodiment, the number of printers that print data concurrently can vary.

The data transmission routine of S305 in FIG. 8 will now be explained with reference to the flow chart of FIG. 9.

The overall printing speed of the printers connected to the print server 10 and available for printing is obtained (S401). The printing speed is then compared with the data transmission speed for the pages to be sent based on the job header table (S402). For example, where the number of printers available for printing is four and image data for 1,000 pages is to be divided and sent to the four printers, the number of pages to be sent to each printer is 1000÷4=250. One set of four pages is sent to the four printers, respectively, during each cycle of operation. An index value N=0,1,2 . . . 249 is incremented after each cycle is completed. The pages to be sent to each of the four printers during a given cycle N are, respectively, page (1+N), page (251+N), page (501+N) and page (751+N). The data transmission speed for these pages is compared with the printing speed.

When the comparison between the printing speed and the data transmission speed for the pages to be sent during a particular cycle indicates that unprintable pages will result (YES in S403), the printing speed is reduced by reducing the number of printers to concurrently perform printing, in order to prevent missing image parts (S404). Specifically, where the printing speed of each printer is 40 PPM and the slowest data transmission speed among the pages to be sent is 119 PPM, the number of concurrently operating printers is set at two, such that the printing speed becomes 119 PPM or lower, and data transmission to the other printers is stopped. This is achieved by sending packet data for which only the channels assigned to the two printers, to which data transmission is to be carried out, are designated based on the IEEE 1394 standard, for example. When there are determined to be no unprintable pages (NO in S403), the number of printers available for printing, which was obtained in S401, is set as the number of concurrently operating printers. The image data is then sent to the number of printers thus set (S405). Where the number of printers has been reduced (YES in S406), the remaining image data is sent to the printers to which data transmission was stopped in S404 (S407). Specifically, based on the IEEE 1394 standard, packet data for which the channels assigned to the printers to which the image data was not sent in S405 is sent in S407. Where the number of printers has not been reduced (NO in S406), S407 is skipped. Thus, with reference to the example of FIG. 6, during the first transmission cycle (N=0), each of pages 1, 251, 501 and 751 has a data transmission speed greater than 160 PPM. Therefore, each of these four pages is sent to a respective printer 20-23 during S405, and S407 is skipped. During the next cycle (N=1), page 2 has a data transmission speed less than 160 PPM, so the number of concurrent printers is reduced to 2. At S405, pages 2 and 252 are transmitted to printers 20 and 21, respectively. Then, at S407, pages 502 and 752 are transmitted to printers 22 and 23, respectively.

It is then determined whether or not all of the pages have been sent (S408), and if not, the routine from step S403 onward is repeated. If completed, the sequence returns to the flow chart in FIG. 8. As described above, by reducing the number of concurrently operating printers only when sending pages for which missing image parts would occur, the printing speed is prevented from exceeding the data transmission speed, thereby allowing missing image parts to be eliminated without substantially compromising the processing speed of the entire system.

The embodiments disclosed herein are examples in every aspect and do not limit the present invention in any respect. The range of the present invention is indicated not by the description provided above but by the claims, and is intended to include constructions equivalent to the claims, as well as all changes and modifications within the scope thereof.

What is claimed is:

1. A print server that concurrently sends multiple pages of print data to a prescribed number of image forming apparatuses for a print job, said print server including a controller that determines whether a minimum data transmission rate for said prescribed number of image forming apparatuses would result in incomplete printed images, and reduces the number of image forming apparatuses to which pages of print data are concurrently sent when such a result would occur.

2. The print server according to claim 1, wherein said controller makes said determination by comparing the data transmission rate for each page to the printing speed of said image forming apparatuses.

3. The print server according to claim 1, wherein said controller makes said determination prior to sending any of the multiple pages for a print job to said image forming apparatuses.

4. The print server according to claim 1, wherein said multiple pages for a print job are cyclically sent to said image forming apparatuses, and wherein said controller makes said determination on a cycle-by-cycle basis.

5. The print server according to claim 4 wherein, for a cycle in which said controller reduces the number of image forming apparatuses, said server sends print data concurrently to said reduced number of image forming apparatuses, and then sends data to the other image forming apparatuses that constitute said prescribed number.

6. The print server according to claim 1 wherein said prescribed number is determined by the number of image forming apparatuses that are available for the print job.

7. A printing system comprising the print server of claim 1 and a plurality of image forming apparatuses connected to said print server.

8. A printing method capable of sending data to a plurality of image forming apparatuses, including the following steps:
   calculating, based on the data size of a page to be printed and the data transmission capacity of the print server, a data transmission speed for said page;
   comparing the data transmission speed and the printing speed for a prescribed number of image forming apparatuses, and determining whether or not there will be missing parts in a printed image when the data is sent to the prescribed number of image forming apparatuses; and
   reducing the number of image forming apparatuses to which the data will be sent when it is determined that there would be missing image parts.

9. The printing method according to claim 8, wherein multiple pages are sent to said image forming apparatuses for a print job, and wherein said comparing and reducing steps are performed prior to sending any of said pages for the print job.

10. The printing method according to claim 8, wherein multiple pages are cyclically sent to said image forming apparatuses for a print job, and wherein said reducing step is performed on a cycle-by-cycle basis.

11. The printing method according to claim 10, wherein said comparing step is also performed on a cycle-by-cycle basis.

12. The printing method according to claim 10 wherein, for a cycle in which the number of image forming apparatuses is reduced, the following steps are performed:
   sending data concurrently to the reduced number of image forming apparatuses; and
   thereafter sending data to the other image forming apparatuses that constitute said prescribed number.

13. A printing program recorded on a computer-readable medium, that is capable of sending data to a plurality of image forming apparatuses, said program causing a computer to execute the following steps:
   calculating, based on the data size of a page to be printed and the data sending capacity of the computer, a data transmission speed for said page;
   comparing the data transmission speed and the printing speed for a prescribed number of image forming apparatuses, and determining whether or not there will be missing parts in a printed image when the data is sent to the prescribed number of image forming apparatus; and
   reducing the number of image forming apparatuses to which the data will be sent when it is determined that there would be missing image parts.

14. The printing program according to claim 13, wherein multiple pages are cyclically sent to said image forming apparatuses for a print job, and wherein said comparing and reducing steps are executed prior to sending any of said pages for a print job.

15. The printing program according to claim 13, wherein multiple pages are cyclically sent to said image forming apparatuses for a print job, and wherein said reducing step is executed on a cycle-by-cycle basis.

16. The printing program according to claim 15, wherein said comparing step is also executed on a cycle-by-cycle basis.

17. The printing program according to claim 15 wherein, for a cycle in which the number of image forming apparatuses is reduced, the following steps are executed:
   sending data concurrently to the reduced number of image forming apparatuses; and
   thereafter sending data to the other image forming apparatuses that constitute said prescribed number.

* * * * *